(No Model.)
G. O. GRIDLEY.
ANTIFRICTION BEARING.
No. 595,060. Patented Dec. 7, 1897.
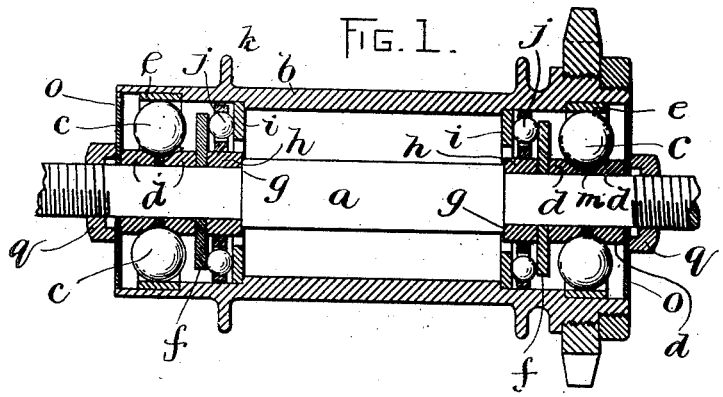
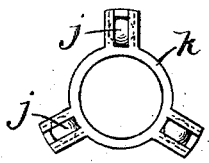
WITNESSES:
A. D. Harmon.
P. W. Pezzetti.
INVENTOR:
George O. Gridley

UNITED STATES PATENT OFFICE.

GEORGE O. GRIDLEY, OF SPRINGFIELD, MASSACHUSETTS.

ANTIFRICTION-BEARING.

SPECIFICATION forming part of Letters Patent No. 595,060, dated December 7, 1897.

Application filed January 25, 1897. Serial No. 620,515. (No model.)

*To all whom it may concern:*

Be it known that I, GEORGE O. GRIDLEY, of Springfield, in the county of Hampden and State of Massachusetts, have invented certain new and useful Improvements in Antifriction-Bearings, of which the following is a specification.

This invention relates particularly to bearings for hubs of bicycle-wheels, although it may be embodied in any bearing which comprises two members, one of which is inclosed and is analogous to a shaft or axle, while the other is the inclosing member and is analogous to a hub, the two members being separated by a series of balls running on coinciding tracks, the balls running on an external track on the inclosed member and an internal track on the inclosing member.

The invention has for its object to enable the balls to run with the minimum of frictional resistance and slip and without the wedging or cross-rolling pressure to which the weight-supporting balls of ordinary ball-bearings are subjected.

The invention also has for its object to provide certain improvements relating to the construction of bicycle-wheel hubs and dust-guards therefor.

The invention consists in the improvements which I will now proceed to describe and claim.

Of the accompanying drawings, forming a part of this specification, Figure 1 represents a longitudinal section of a bicycle-wheel hub and its axle in which my improvements are embodied. Fig. 2 represents a detail view of one set of the thrust-supporting balls and the cage supporting the same.

The same letters of reference indicate the same parts in both figures.

Referring first to Fig. 1, $a$ represents the fixed axle, on which the hub $b$ of a bicycle-wheel rotates.

$c$ $c$ represent the usual weight-supporting balls interposed between the axle and hub, said balls bearing on an external track on the axle and an internal track on the hub. As here shown, the said external track comprises two conical collars $d$ $d$ on the axle, collectively forming a V-shaped or grooved track, while the internal track is composed of a ring $e$, inserted in a chamber or cavity formed for its reception in the hub $b$. The internal track may, however, be an integral part of the hub instead of being formed by an inserted ring. The inner collar or cone $d$ is secured or backed against inward movement on the shaft, preferably by a ring $h$, backed by a shoulder $g$ on the axle $a$. The outer collar or cone $d$ is movable inwardly toward the inner cone to adapt the cones to the diameter of the balls, an adjusting collar or nut $q$, engaged with a screw-thread on the axle, serving to move the outer cone inwardly and secure it in position. Provision is thus made for compensating for wear of the cones, the collars or cones $d$ $d$ being set up as they become worn. To prevent such excessive inward movement of the outer cone as would bind the balls between the tracks, I provide a stop to limit the inward movement of the outer cone. The stop is here shown as a loose ring $m$, interposed between the two cones, said ring being interchangeable with other rings of greater or less width, so that whenever it is necessary to effect a readjustment the ring may be reduced in width or another substituted for it. The same result may be attained by allowing the cones to bear on each other and grinding off the end of one or both when it is desired to effect a readjustment or by making the ring $m$ of a series of thin layers separable from each other, a greater or less number of said layers being employed according to the adjustment desired. The internal or opposite track $e$ presents a cylindrical surface to the balls $c$, said surface being flat in cross-section, so that its contact with the balls is reduced to the minimum. The cylindrical surface bears only on the outer portions of the balls at points equidistant from their points of bearing on the collars $d$ $d$, so that the stress or pressure to which each ball is subjected is through its center. Hence there is no such wedging or cross-rolling pressure on the balls as would be the case if one of the tracks were a cup and the other a cone, the two being relatively arranged, as usual, in bearings in which the same balls sustain both the weight and the end thrust.

The cylindrical and grooved tracks above described do not provide sufficiently for the support of end thrust, and I have therefore provided antifrictional end-thrust bearings, the preferred construction of which will next be described.

$f$ $f$ represent outwardly-projecting flanges affixed to the axle *a* adjacent to the balls *c*, said flanges being annular and preferably secured to the axle by being placed thereon between the inner conical collars *d* and the rings or collars *h*.

*i i* represent inwardly-projecting flanges affixed to the hub *b* and arranged between the flanges *f f*, the said flanges *i i* projecting inwardly sufficiently to form faces or bearings opposing the bearings presented by the flanges *f f*. The flanges *i* and *f* present flat ball-supporting faces which are in planes at right angles to the axis of rotation.

*j j* represent thrust-supporting balls which are interposed between the flanges *f i*, there being two series of balls *j*. Said balls may be kept in place between the flanges *f i* by means of ball-cages *k*, formed as arms radiating from a central hub and having cavities to receive the balls and permit the balls to project from opposite sides of the arms.

It will be seen that the flanges *f i* and balls *j* are arranged to prevent endwise movement of the hub *b* in either direction and that the flat faces of the flanges give each ball *j* but two points of contact, so that friction between the balls and flanges is reduced to the minimum. It will also be seen that the conjoint use of the antifriction thrust-bearings, the cylindrical ball-tracks, and the adjustable grooved ball-tracks reduces the frictional resistance to the rotation of the hub to the minimum, the thrust-bearings enabling the hub to run without endwise displacement and entirely relieving the balls *c* of the duty of resisting end thrust. It is obvious that the grooved adjustable track may be applied to the external member and the cylindrical track to the internal member without departing from the spirit of my invention.

The distance between the flanges *f* and *i* may be adjusted by varying the width of the rings *h*, said rings, together with the flanges *f* and collars *d d*, being detachably mounted upon the axle *a*, so that they can be readily removed.

*o o* represent dust-guards, which are thin annular plates formed to be placed upon the outer portions of the axle *a* and fill the ends of the hub. Said dust-guards, as well as the collars *d d*, flanges *f*, and rings *h*, are secured in place upon the axle by means of adjustable clamping members, which may be the nuts *q q*, the outer collars *d* constituting complemental clamping members between which and the nuts *q* the dust-guards are grasped.

The axle *a* and hub *b* constitute two members of a bearing, the axle being the inclosed member and the hub the inclosing member. It is obvious that the inclosed member may rotate in the inclosing member, the latter being fixed. Hence my invention may be embodied in a crank-shaft and its hanger.

The flange *f*, inner conical collar *d*, and ring *h* may be made in a single piece, if desired.

The cylindrical track *e* is adapted to bear on the balls *c* with equal effect at any part of its width. Hence the operative relation of the ball-tracks and balls is not affected by a movement of either part lengthwise of the axle *a*.

It will be seen, therefore, that any lateral displacement of the balls that may be caused by the adjustment of one collar *d* toward the other to compensate for wear or an independent longitudinal adjustment of either member relatively to the other will have no detrimental effect.

I claim—

1. A bearing of the character specified, comprising an inclosing member, an inclosed member concentric therewith, two sets of ball-tracks adjacent to the ends of said members and including means for adjusting the balls radially, thrust-abutments between said members and between the two sets of ball-tracks, and thrust-supporting balls interposed between said abutments.

2. A bearing of the character specified, comprising an inclosing member, an inclosed member concentric therewith, a grooved ball-track on one of said members consisting of two conical collars one being adapted to be moved toward the other to take up wear, a cylindrical ball-track on the other member, balls interposed between said tracks, thrust-abutments between said members, having faces arranged at right angles to the axis of rotation, and thrust-supporting balls between said abutments, a dust-guard consisting of a thin plate bearing against the movable collar and fitting and movable within the outer end of the inclosing member, and means for pressing the center of the dust-guard against the said movable collar.

3. A bearing of the character specified, comprising an inclosing member, an inclosed member concentric therewith, a grooved track on one of said members consisting of two conical collars one being adapted to be moved toward the other to take up wear, a cylindrical track on the other member, balls interposed between said tracks, two pairs of thrust-abutments, one abutment of each pair being affixed to the inclosing member, and the other to the inclosed member, each abutment presenting a ball-supporting face which is in a plane at right angles to the axis of rotation, thrust-supporting balls interposed between said abutments, a dust-guard consisting of a thin plate bearing against the movable collar, and movable within the outer end of the inclosing member, and means for pressing the center of the dust-guard against the said movable collar.

In testimony whereof I have signed my name to this specification, in the presence of two subscribing witnesses, this 15th day of December, A. D. 1896.

GEORGE O. GRIDLEY.

Witnesses:
A. W. DOUBLEDAY,
P. H. CUMMINGS.